UNITED STATES PATENT OFFICE.

ANTHONY G. BAKEVICH, OF NEW BRITAIN, CONNECTICUT.

BELT-DRESSING.

1,137,450.

Specification of Letters Patent. Patented Apr. 27, 1915.

No Drawing. Application filed July 2, 1914. Serial No. 848,596.

*To all whom it may concern:*

Be it known that I, ANTHONY G. BAKEVICH, a citizen of Russia, residing at New Britain, in the county of Hartford and State of Connecticut, have invented certain new and useful Improvements in Belt-Dressings, of which the following is a specification.

My invention relates to improvements in belt-dressings, and the object of my improvement is to produce a composition of matter suitable to be applied on belts used with pulleys for power transmission for machinery by being applied to the surface that engages with the pulleys, and which will serve to increase the adhesive power between the belt and the pulley, thereby reducing the slippage of the belt and the frictional heating resulting therefrom, and increasing the belt efficiency and life. Furthermore, the composition of matter that I have produced for the purposes mentioned is in liquid form, is easily manufactured, at moderate cost, and is easily applied to the surface of a belt.

Whereas it is understood that in certain circumstances the proportions of the ingredients used in the compounding of my composition of matter as given herewith the said proportions as so given are what I prefer to use and which I have found to give the best results under the most ordinary conditions of usage. The said ingredients and the proportions in which they are used are as given herewith:—5 parts by weight of kerosene oil, 4 parts of pine tree pitch, 2 parts of spruce tree pitch, and 2 parts of castor oil. The ingredients as specified are placed together in a liquid container, and are in liquid form, and which form they maintain constantly under normal atmospheric conditions. Accordingly, my belt dressing may be packed and shipped either in bottles or closed tin containers and is readily applied to the belt therefrom. In applying the belt dressing to the belt it is best to spread the same uniformly over the surface of the belt.

I find that with pine tree pitch alone, without the spruce tree pitch, the composition is too weak, and with spruce tree pitch alone the composition is too strong, and also it dries out too quickly. With the two kinds of pitch used as mentioned a medium result is obtained that is superior and satisfactory. That is to say, with pine tree pitch alone the composition does not hold the belt so good, and with the spruce tree pitch alone the belt sticks too much, and does not last so long on the belt. The drying out feature, as referring to the use of spruce tree pitch alone applies to conditions previous to use on the belt, when contained in open vessels.

I claim as my invention:—

1. A composition of matter suitable for use as a belt dressing comprising a mixture of kerosene oil, pine tree pitch, spruce tree pitch, and castor oil.

2. A composition of matter suitable for use as a belt dressing comprising a mixture of the following ingredients and in the proportions indicated by weight, kerosene oil, 5 parts, pine tree pitch, 4 parts, spruce tree pitch, 2 parts, and castor oil, 2 parts.

ANTHONY G. BAKEVICH.

Witnesses:
LOUIS M. SCHMIDT,
HARRIETTE G. SCHMIDT.

Copies of this patent may be obtained for five cents each, by addressing the "Commissioner of Patents. Washington, D. C."